United States Patent [19]
La Roche

[11] Patent Number: 5,823,480
[45] Date of Patent: Oct. 20, 1998

[54] WING WITH A WING GRID AS THE END SECTION

[76] Inventor: Ulrich La Roche, Heiligshüsli 18, 8053 Zürich, Switzerland

[21] Appl. No.: 595,588

[22] Filed: Feb. 1, 1996

Related U.S. Application Data

[63] Continuation-in-part of Ser. No. 343,519, Dec. 5, 1994, abandoned.

[30] Foreign Application Priority Data

| Apr. 5, 1993 | [CH] | Switzerland | 1 032/93-2 |
| Nov. 2, 1993 | [CH] | Switzerland | 3 293/93-7 |
| Mar. 30, 1994 | [WO] | WIPO | PCT/CH94/00067 |

[51] Int. Cl.$^6$ .......................... B64C 03/42; B64C 03/54; B64C 23/06
[52] U.S. Cl. .............. 244/199; 244/48; 244/218
[58] Field of Search ................ 244/198, 199, 244/46, 91, 218, 48

[56] References Cited

U.S. PATENT DOCUMENTS

| 1,466,551 | 8/1923 | Thurston . | |
| 1,841,921 | 1/1932 | Spiegel . | |
| 2,743,888 | 5/1956 | Lippisch . | |
| 4,595,160 | 6/1986 | Santos | 244/199 |
| 4,671,473 | 6/1987 | Goodson | 244/199 |
| 5,312,070 | 5/1994 | Arena | 244/46 |

FOREIGN PATENT DOCUMENTS

| 2349494 | 11/1977 | France . |
| 196410 | 4/1923 | United Kingdom . |
| 846322 | 8/1960 | United Kingdom . |
| 8800153 | 1/1988 | WIPO . |

OTHER PUBLICATIONS

ICAS Proceeding, 20th Congrss of The International Council of The Aeronautical Sciences, vol. 2. Sep. 1996.

*Primary Examiner*—Virna Lissi Mojica
*Attorney, Agent, or Firm*—Walter C. Farley

[57] ABSTRACT

A wing with a wing span (b) has a main part (1), which has a substantially closed surface with respect to the flow (v) and is provided at its free end with an end section in the form of a wing grid. The wing grid has at least two parallel-staggered winglets (2). The wing grid as part of the wing span (b) takes over the intended profile circulation at the attachment point to the main part and subdivides that circulation approximately uniformly over the winglets. The same lift is produced in the end section with the at least two winglets. Thus, for the wing the spanwise lift distribution is more regular and the induced resistance is decreased. An upper or lower limit for the action is obtained as a function of whether, as a result of the fixed wing grid for the entire wing, a rectangular circulation distribution is produced or only for the part of the overall span replaced by the wing grid. For the wing with wing grid there is a corresponding reduction of the induced resistance as compared with a conventional wing without a wing grid for the same resulting aspect ratio.

14 Claims, 6 Drawing Sheets

WING WITH A WING GRID AS THE END SECTION

CROSS-REFERENCE TO RELATED APPLICATION

This application is a continuation-in-part of application Ser. No. 08/343,519 filed Dec. 5, 1994 and now abandoned.

FIELD OF THE INVENTION

This invention relates to a wing whose main part has a surface around which there is a flow and with a tip part having at least two winglets.

1. Background of the Invention

The construction of wings is always a compromise between strength, for which a small aspect ratio is best, and the induced drag, which requires a large aspect ratio of the wing and, together with the profile resistance, determines the lift-drag (L/D) ratio.

For theoretical reasons it would be desirable to recover part of the energy given off to the flow medium in the lateral vorticity at the free wing tip, which vorticity determines the induced drag, or to completely avoid the delivery thereof.

2. Prior Art

Recovery with a propeller is known. A partial reduction with suitable shaped end plates is known. The prior art also discloses various arrangements of individual winglets (e.g. DE-OS 3242584) or several such winglets in series with a negative angle of incidence with respect to the wing chord (DE-OS 36721800), whose function is to obtain from the wing tip vorticity useful propulsion and/or lift force by individually adapted partial deflection.

It is also known to use a split fan-like subdivision of preferably the outer third of the length of a wing for improving the efficiency (EP 282 830) by subdividing the boundary layer running length into laminar portions.

It is also known to subdivide the wing into parallel, grid-like individual wings with varying length (FR 7612470, published under No. 2349494) for better control of the wing action.

It is also known to use so-called air waffles, namely a wing grid with overlapping winglets, as wings (DE 37 30 798) whose overall angle of incidence during flight, and while maintaining the angle of incidence of the winglets, is modified for changing the lift up to an end position in which the winglets are in overlapping contact.

The replacement of an aircraft wing by an overlapping wing grid over the entire span is also known (DE 2657714), which also causes a rise in efficiency.

It is also known to take over the local profile circulation and deliver it at its outer end by means of one or more spiral loops distributed uniformly over the main wing chord (Aviation Partners, Dr. Louis B. Gratzer, Seattle).

SUMMARY OF THE INVENTION

An object of the invention is to modify the wing tip of a deep, short wing with a small aspect ratio to obtain lift-drag ratios which would otherwise only be achievable with much more slender wings having a large aspect ratio, or to increase the L/D ratios of an existing wing by reducing the induced drag.

BRIEF DESCRIPTION OF THE DRAWINGS

Embodiments of the wing according to the invention are described in greater detail hereinafter relative to the drawings, wherein.

DESCRIPTION OF THE PREFERRED EMBODIMENTS

Figure 1:
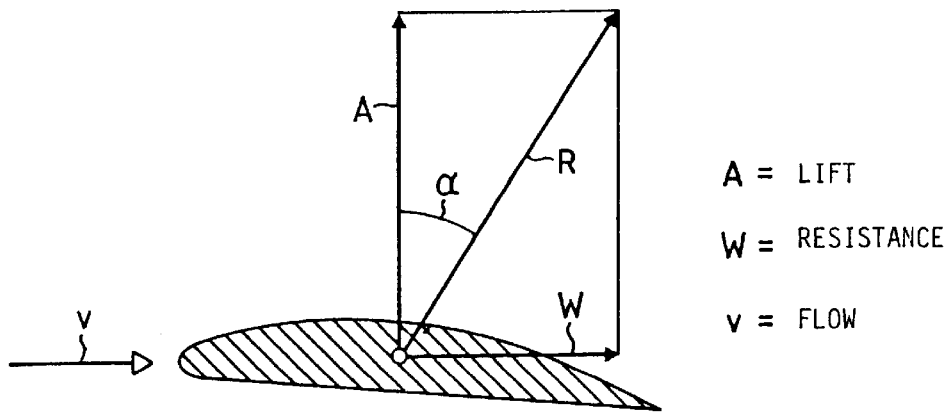
FIG. 1 is a sectional view of a wing showing the conventional force distribution in lift and drag resulting from air flow across a wing profile for defining the L/D ratio.

According to the invention a partial span of the wing is replaced by a wing grid formed from at least two parallel, staggered winglets. The winglets constitute a grid which uses the aerodynamic interference of the individual winglets in such a way that the overall wing structure's total circulation leaves the wing structure only at the tip of the grid. This wing grid takes over the circulation around the wing profile fully on that side in which the wing passes into the fixed wing grid. The upper limit used as a basis is the circulation around the wing profile without any wing tip vorticity, which is replaced by the wing tip vorticity of the wing grid. The winglets of the wing according to the invention are preferably twist-free and preferably the angles of incidence thereof are jointly or individually adjustable.

According to the invention such a wing has at the end of the main part a wing grid as an end section. At the end of the main part on a chord t is attached the wing grid, which produces the same specific lift per length unit of the wing span as the main part at the fixing point. The wing can e.g. be the wing of an aircraft or a propeller, or the sail or centerboard or drop keel of a boat, etc.

The invention extends much further than the known solutions in which, by individually adapted winglets, the wing tip vorticity is utilized and avoids the incomplete use of the effect according to known solutions with several fan-like arranged winglets.

Compared with a closer solution with a regular wing grid and at least three winglets, according to the preferred embodiment only at least two winglets are used, but they must be staggered in parallel. The effect of the wing according to the invention could at best be achieved with a known fan-like arrangement of winglets if the profiles and angles of incidence of the winglets could be adapted over their span to a given degree of splitting. The negatively acting, maximum grid spacing in known fan-like ends is avoided with the parallel staggering of the winglets according to the invention.

The wing grid of the wing according to the invention with its parallel-staggered, at least two winglets can in the case of changes of angle of incidence follow up the incident flow v as a whole, without having to modify the grid parameters and, particularly when there is no overlapping, can be effective without any follow-up for a large range of angle of incidence. However, e.g. an air waffle, which represents the complete lift producing surface of several wings, during its adjustment modifies the multiplane effect and the overlapping winglets lead to a narrow range of angle of incidence usable for an adjustment. As opposed to the wing according to the invention, with such a waffle it is not possible to achieve, in a wing with a small aspect ratio, an increase in L/D ratio. The known, overlapping wing grid over the entire span, which in fact represents a multiplane with a small stagger, does not give a multiplane effect for the induced drag, but instead a considerable increase in the profile resistance. Wings which are split up in grid-like manner and with a varying length of the individual wings also suffer from this disadvantage, because the individual wings also extend over the entire span. Compared with a wing with the known spiral loops for leading off the local profile circulation, the same effect is exerted by the wing according to the invention with a planar and therefore less cross-wind-sensitive and structurally simpler arrangement.

If the at least two winglets of the wing according to the invention are connected by a retaining frame, there is an approximation to the action of a wing grid formed from several winglets without a retaining frame and a wing grid formed from at least three winglets is supplemented and extended by an effective range.

As only the staggering of the winglets of the wing according to the invention must be in parallel, whereas the other grid parameters regarding the distribution of circulation to be removed can be adapted over the chord of the main part, further optimization of the adaptation to the conditions of the main part is possible.

FIG. 1 shows the incident flow v of a wing profile with finite span or wingspread, resulting in a lift A and a resistance W. The ratio of these forces gives the L/D ratio according to the formula:

$$\frac{L}{D} \text{ ratio} = \frac{A}{W}$$

in which W=WI+Wr=induced drag+frictional resistance.

The wing according to the invention reduces the part WI which is the induced drag caused by the flow round the wing tips.

Figure 2:
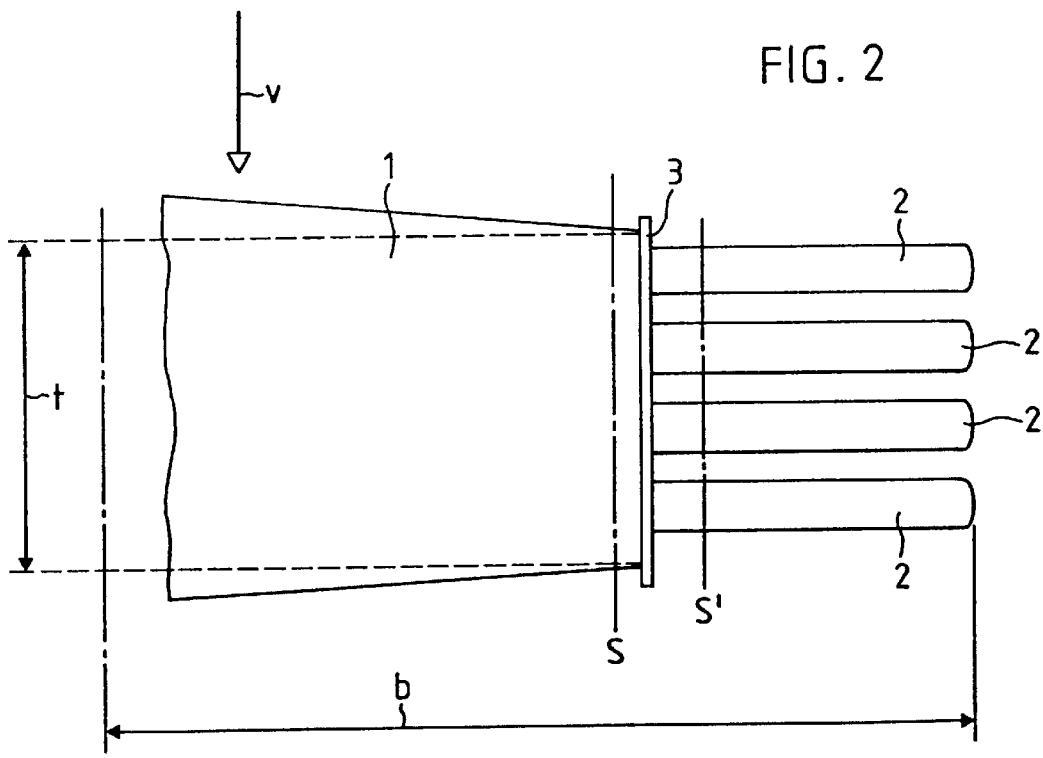
FIG. 2 is a schematic plan view of the end portion of a wing according to the invention with a wing grid attached to the conventional main part as a lift producing section with the same specific lift per unit length of span as the specific lift of the main part in the area of the attachment of the wing grid.

FIG. 2 shows a wing with a main part 1, which begins at the symmetry plane in the center. To the main part 1 is attached, as a portion of the total lift-producing wing span b, a wing grid comprising winglets 2 of similar orientation and parallel staggering. The winglets 2 are distributed along the chord t.

The desired effect for the wing area in which the grid is attached to the main part is obtained if the circulation in the profile sections S and S' is of the same size and similar rotation axis and if the winglets form a wing grid which zonally takes over the circulation along the chord of the main part. The attachment area of the wing grid is, as illustrated, constructed as a partition 3.

Figure 3:
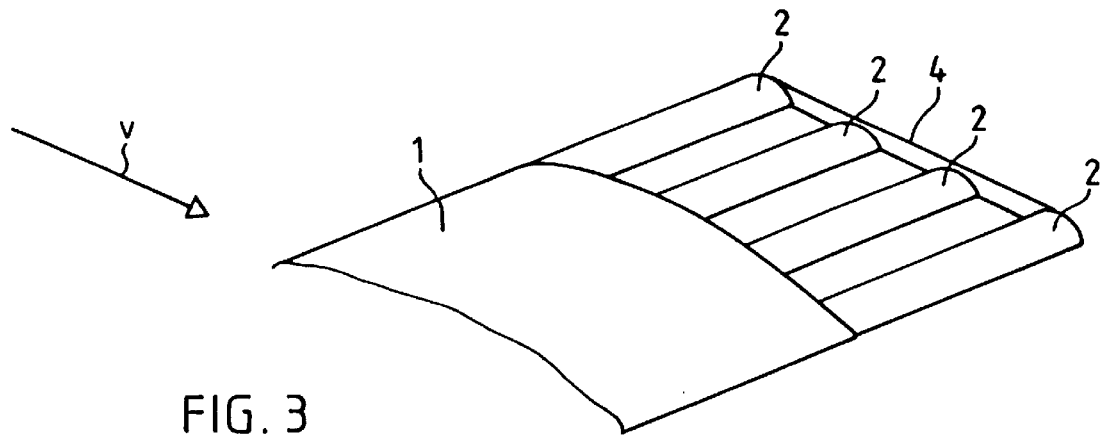
FIG. 3 is a perspective view of an embodiment of the wing grid with a retaining frame.

FIG. 3 shows an embodiment of the wing according to the invention in which the outer ends of the winglets 2 are held in a retaining frame 4, which has the function of a closing face for the flow distribution.

Figure 4:
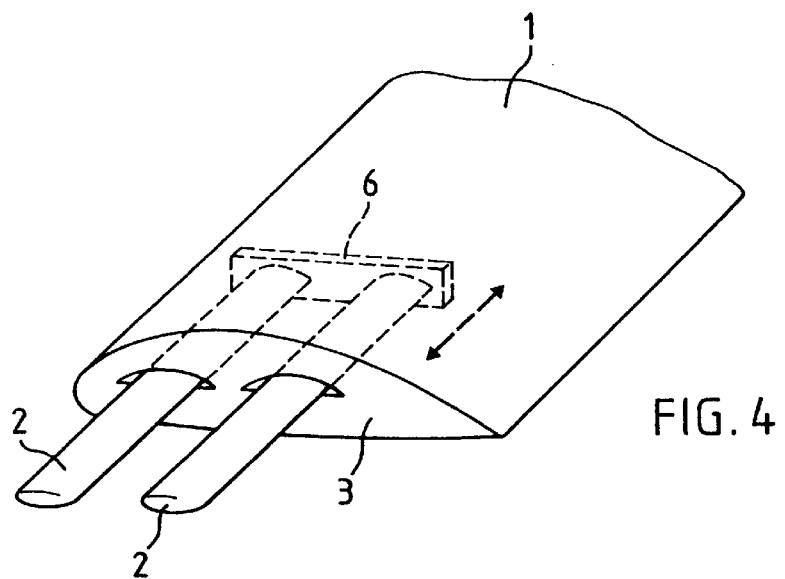
FIG. 4 is a perspective end view of a wing with a wing grid which can be extended from or retracted into the main part of the wing.

FIG. 4 is an embodiment of the wing according to the invention with an extendable wing grid, whose winglets are fixed to a plate 6 and are moved in an entire group. Embodiments are also conceivable with individually extendable winglets.

Figure 5:
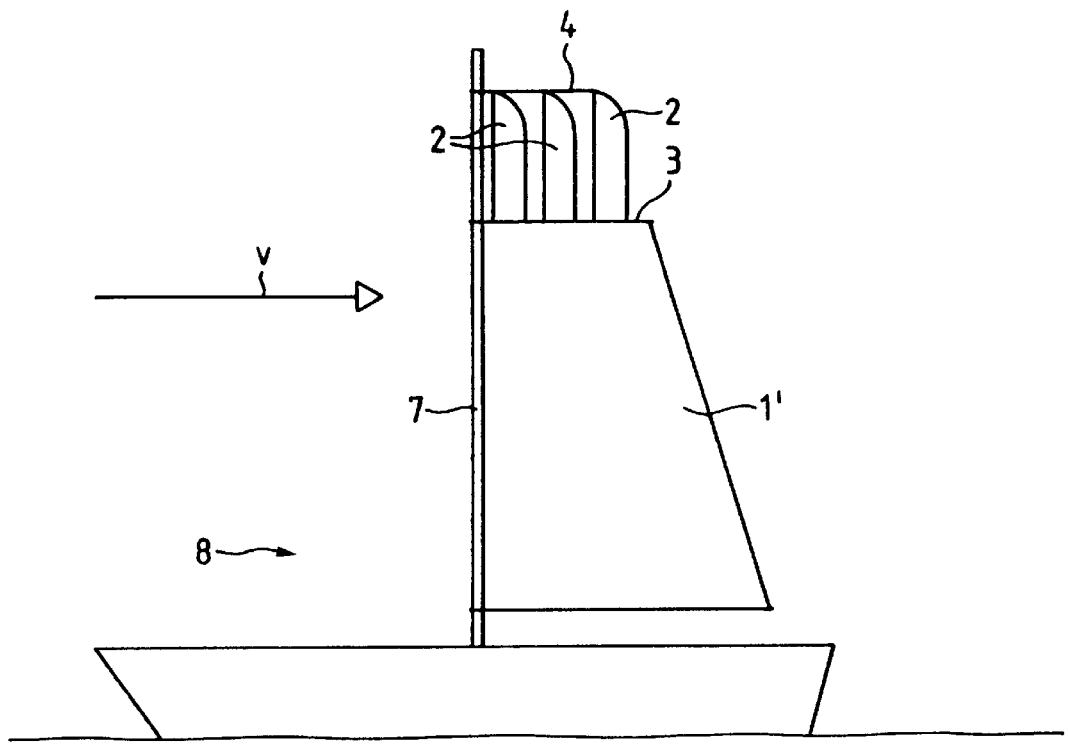
FIG. 5 is a schematic side elevation of a use of the wing according to the invention on the main sail of a yacht.

FIG. 5 shows a wing according to the invention applied to a yacht 8 with a mast 7 and main sail 1, the upper edge of the sail being provided with a wing grid (2, 4).

Figure 6:
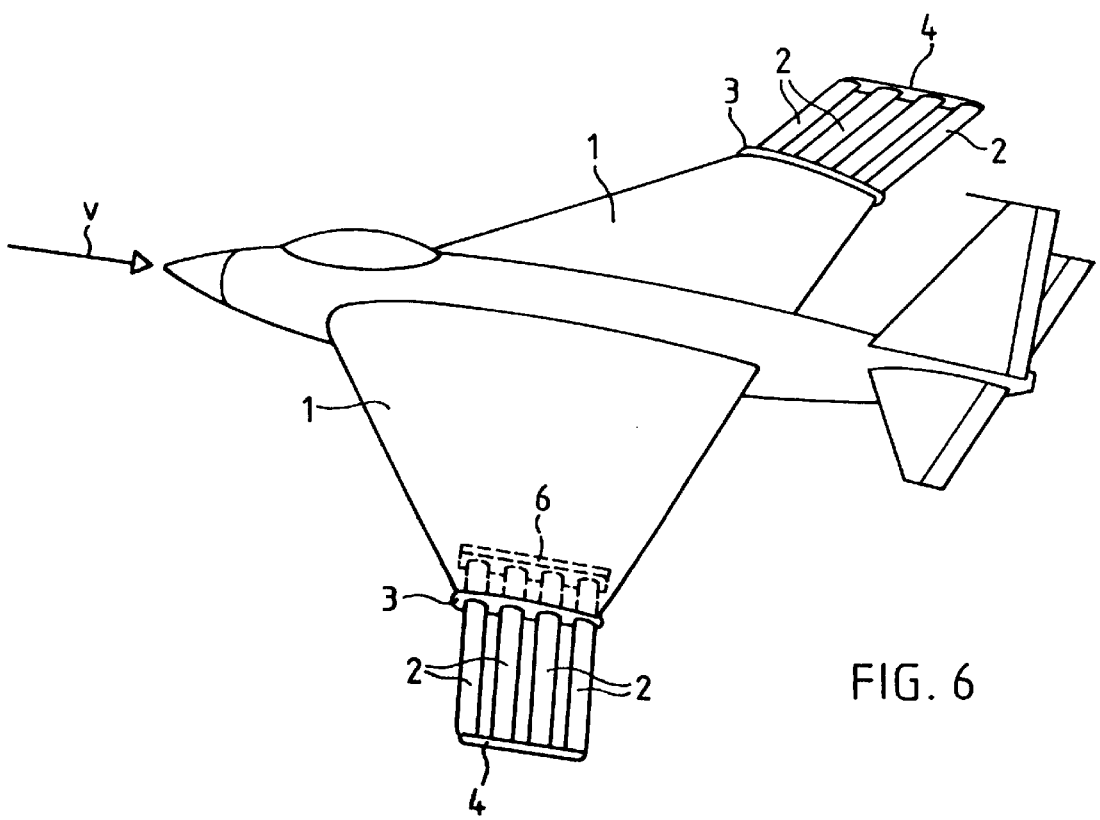
FIG. 6 is a perspective view of a use of the wing according to the invention on an aircraft.

FIG. 6 shows an embodiment of the wing according to the invention with a wing grid constituted by winglets 2, partition 3 and retaining frame 4, the winglets being extendable as a group with the plate 6 from the main part 1 of a triangular aircraft wing.

Figure 7:
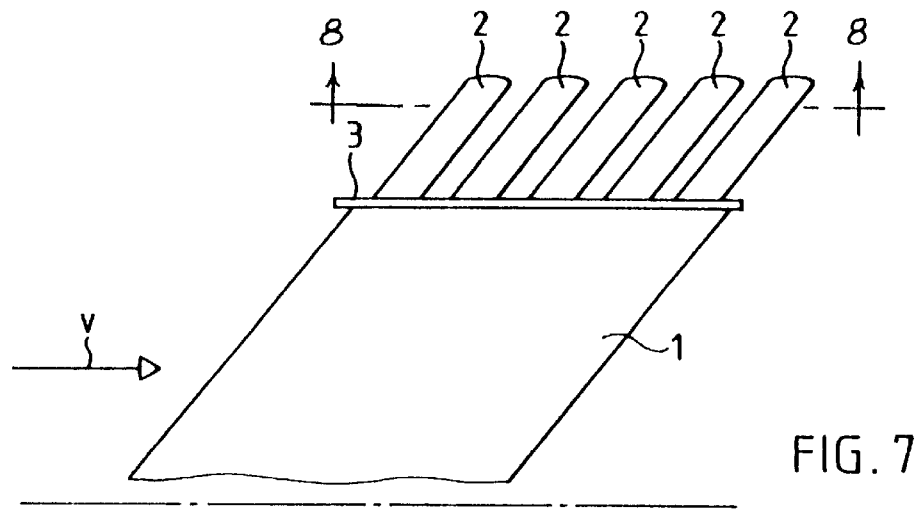
FIG. 7 is a side elevation of a wing with wing grid and sweepback as required by high subsonic speeds.

FIG. 7 shows the use of a swept back wing grid, such as is e.g. used for high subsonic speeds. As a function of the design of the winglets 2, as a function o the angle of incidence and profile thickness of the winglets, the resulting sweepback designed for the same Mach number differs from the sweepback of the main wing part 1.

Figure 8:
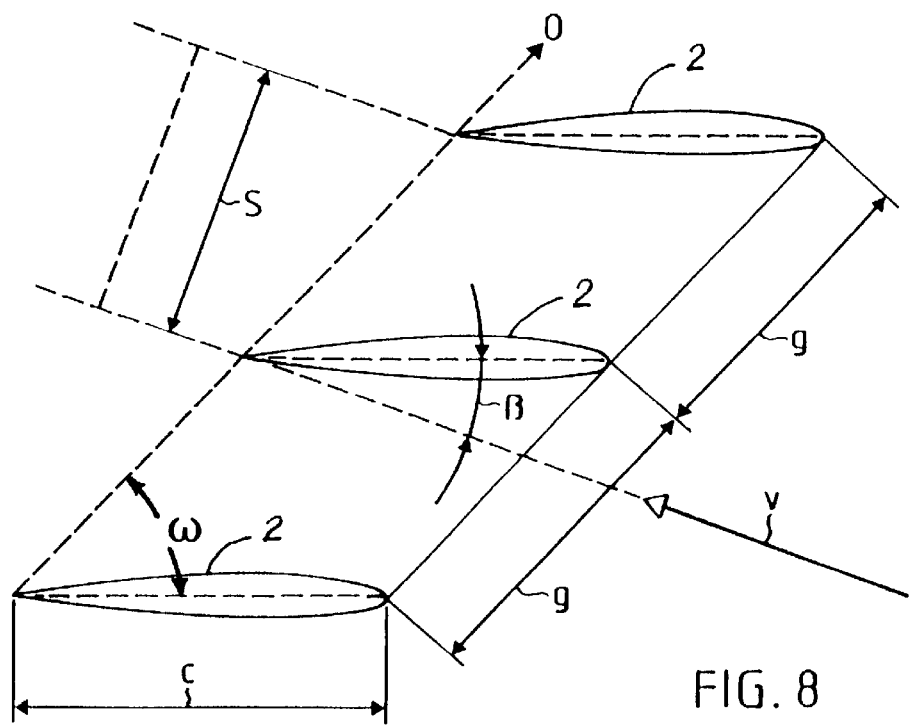
FIG. 8 is a schematic side elevation in section along line 8—8 of FIG. 7 of a generalized wing grid showing the designations of the grid parameters.

FIG. 8 shows the designations of the grid parameters of a wing grid for a wing according to the invention. The staggering direction 0 of the wing grid to the incident flow direction v can be chosen at random but what is decisive for the effect is the angle of incidence β, based on the chords, as shown in the drawing, or, more specifically, measured relative to the zero incident flow angle of the winglets, the lengths of the chords c and the staggering s transversely to the incident flow direction v. The quantity g is the grid spacing in the staggering direction 0, and ω is the staggering angle.

The wing of the invention with the grid of winglets at its tip shows, compared with a similar wing of the same span but without the described tip, a smaller induced drag. This has been shown in wind tunnel experiments. It can be explained as follows.

According to the formula of Spreiter and Sacks (J. R. Spreiter and A. H. Sacks, "The Rolling Up of the Trailing Vortex Sheet and its Effect on the Downwash Behind Wings", Journal of the Aeronautical Sciences, January 1951, pages 21 and following), the relative induced drag $X_{ell}$ of a wing (induced drag of the wing in question compared with the induced drag of an elliptical reference wing) is:

$$X_{ell} = \left(\frac{b}{b'}\right)^2 \left[\frac{1}{16} + \frac{1}{4} \cdot \ln\left(\frac{(b'-r_k)}{r_k}\right)\right]$$

wherein b is the wing span, b' is the distance between the trailing vortices and $r_k$ is the radius of the vortex core measured in the so-called Treffitz plane downstream of the wing-wingtip configuration.

This relationship shows that by increasing b' and/or by increasing $r_k$, the induced drag is decreased.

The grid of winglets forming the tip of the inventive wing leads to an increase in b' (distance between trailing vortices) because, as the winglets are designed to have the same lift per unit span as the distal end of the main wing part, the whole circulation is taken over by the winglets and continues out to the tip area of the winglets due to the grid interference of the grid arrangement. The trailing vortices are shed over a narrow area of the tips of the winglets instead of over the considerably larger area of a similar wing with a normal tip. The lift vs. span diagram of the inventive wing is substantially rectangular, i.e., b' is substantially equal to b.

The same effect is also achieved by the known wingtip arrangement of Dr. Gratzer (Dr. L. Gratzer, Aviation Week, Dec. 6, 1993), named Spiroid, in which a spiral end-piece connecting winglets of different dihedral orientations is an alternative to the inventive wing grid, assuring that the circulation leaves at the wingtip only. The use of at least two individual winglets contributes in both arrangements (Spiroid and inventive winglet grid) essentially to increase the radius rk of the vortex core.

Other known state-of-the-art embodiments of wingtip arrangements such as, e.g., the sweep back wing tip, the wing tip with end plate or the wing tip with propeller, also owe their beneficial effects to increasing b' but with limited success because generally increasing b' first tends to reduce $r_k$. This is not so with the wing according to the invention whose tip, comprising a grid of winglets, besides increasing the vortex distance also increases the vortex core radius because of the plurality of winglets whose effect is a special kind of double-decker effect.

It is shown that the drag reducing effect of the inventive wing with the winglet grid constituting its tip portion compared with a similar wing with t normal tip is substantially proportional to the aspect ratio of the winglets (inversely proportional to the number of winglets and proportional to the ratio of span of the winglets to span of the main wing part).

Figure 9:
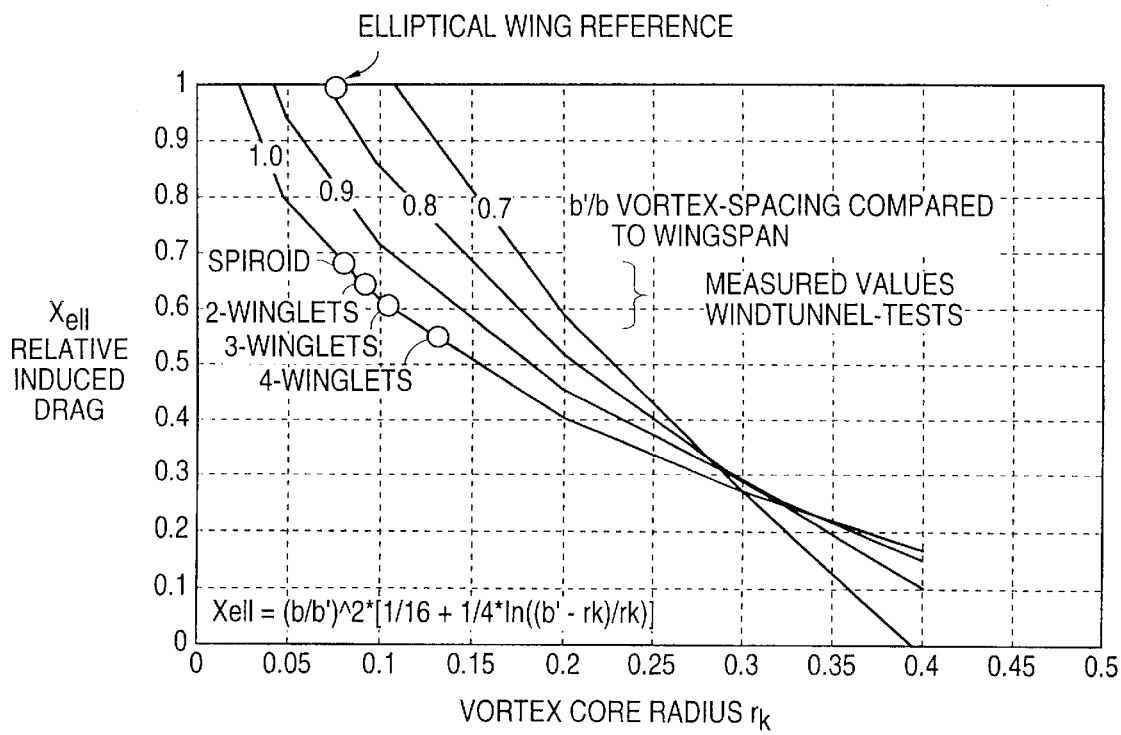
FIG. 9 is a diagram showing the drag-reducing effect of the wing according to the invention.

FIG. 9 shows a diagram of relative induced drag vs. Vortex core radius for wings with differing vortex-distance to span ratios (0.7, 0.8, 0.9, 1.0) according to Spreiter and Sacks, in which diagram results of wind tunnel experiments with three inventive wings (with two, three and four winglets, respectively) and of the Gratzer wing with the Spiroid type wing tip are incorporated. This diagram clearly shows the dependency of the drag-reducing effect of the inventive wing on the number of winglets.

For achieving the described effect, the grid of winglets of the inventive wing must be designed so as to have substantially all the same lift per unit length (span) as the main wing part in the area of the distal end of the main wing part. For this reason, the angle of incidence of the winglets must be positive. Furthermore, it is found to be advantageous if the overlap (chord length to grid-spacing ratio) of the winglets is smaller than one (FIG. 8: c/g<1) and if the staggering angle (FIG. 9: $\alpha$) is substantially the same as the design angle of incidence of the main wing part.

It can be shown that the object of the invention can not only be achieved with a wing having a grid of parallel and staggered winglets to form its tip, but also with a grid of converging or diverging staggered winglets. This means that the condition of parallel-ness for mutual winglet interference is generalized to a condition of identical proportions and orientations in the cross-section of the grid over its span.

Figure 10:
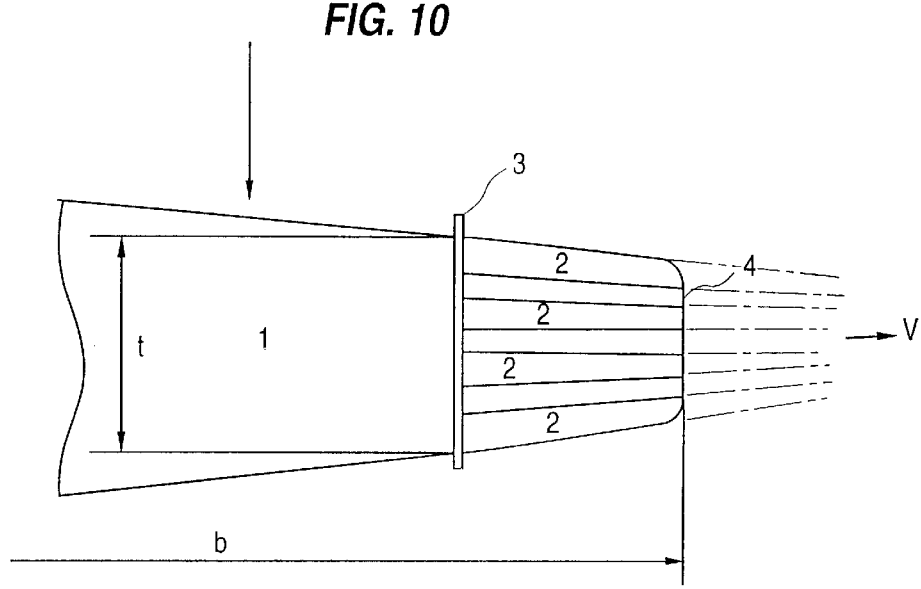
FIGS. 10 and 11 are schematic plan views of two further embodiments of the inventive wing.
Figure 11:
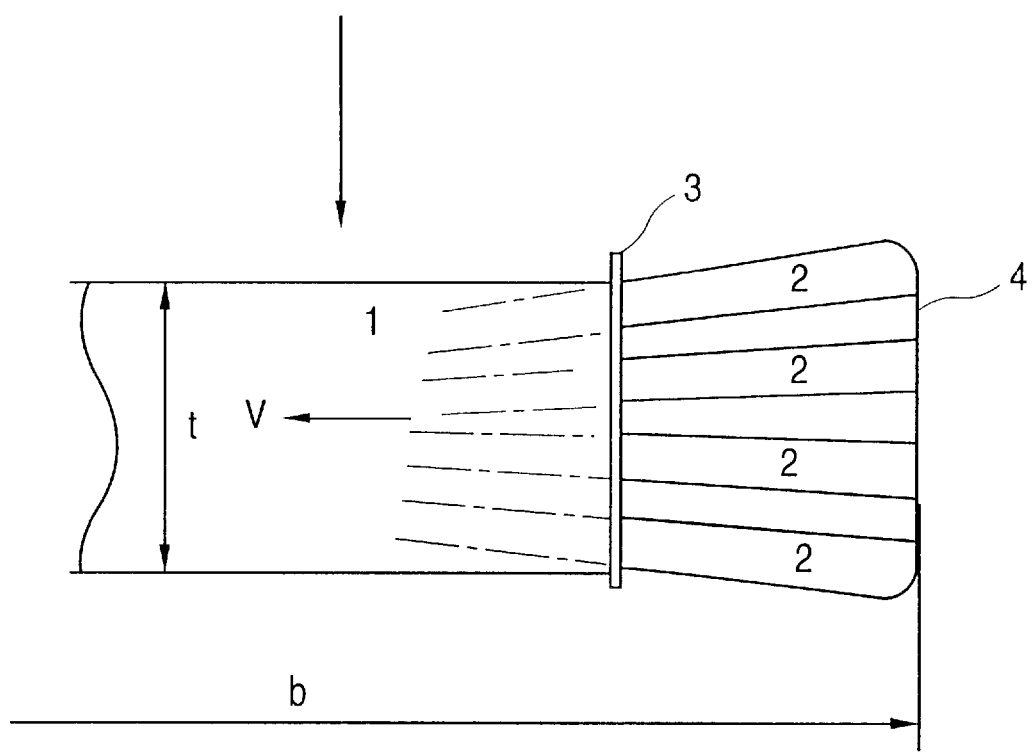

FIGS. 10 and 11 show the tip areas of such wings. The wing according to FIG. 10 has at its tip a converging grid of winglets 2 staggered along the chord t. The grid parameters c and g (FIG. 8) decrease toward the wing tip such that the winglets converge at a vanishing point V outwardly beyond their tips. For such a wing, the drag-reducing effect is slightly smaller than the effect for a wing with a grid of parallel winglets because the vortex distance is smaller. The design condition for such a wing is: lift per unit length of the wing grid in the area where it is fixed to the main wing part is substantially the same as the lift per unit length of the distal end of the main wing part, whereby the lift decreases from the area of the fixation of the winglets toward their tips.

The wing according to FIG. 11 has at its tip a grid of diverging winglets, i.e., the grid parameters c and g increase toward the tips of the winglets such that the winglets converge at a vanishing point V inwardly beyond the area at which the winglets are fixed to the main wing. For such a wing, the drag-reducing effect is increased as the vortex distance b' is increased to a value greater than the span b of the wing.

What is claimed is:

1. A wing comprising the combination of
   a main wing part having a substantially closed surface, a distal end, a chord, a first predetermined span and a predetermined orientation and predetermined attack angle relative to incident fluid flow for producing lift; and
   a tip portion at said distal end of said main wing part, said tip portion comprising:
      a grid of at least two spaced-apart winglets having a second predetermined span, said grid being attached to said distal end of said main wing part and extending the same lift per span unit of undisturbed two-dimensional flow around the profile of the main wing at the attachment to the grid's winglet tips, each of said winglets having substantially the same orientation relative to incident fluid flow as said main wing part, said second predetermined span being no greater than said first predetermined span,
      said winglets having an overlap ratio of winglet chord length to spacing from an adjacent winglet equal to less than one and a ratio of chord length to winglet spacing which is substantially constant along said winglet span where said spacing is measured leading edge to leading edge, and
      said winglets being vertically staggered relative to each other along a line unidirectionally angularly separated from a plane containing the chord of the main wing part.

2. A wing according to claim 1 wherein said grid comprises four winglets.

3. A wing according to claim 1 wherein said line along which said winglets are staggered has an angle above a plane containing said chord of said main wing part substantially equal to or greater than a design angle of incidence of said main wing part.

4. A wing according to claim 1 wherein said winglets are twist-free.

5. A wing according to claim 1 and including means for extending and retracting said tip portion assembly from and into said main wing part.

6. A wing according to claim 1 and including a retaining frame interconnecting distal ends of said winglets.

7. A wing according to claim 1 and including selectable individual parameters for individual ones of said winglets.

8. A wing according to claim 7 wherein said individual parameters for individual ones of said winglets include the length of each winglet chord, a flow angle for said winglets including zero incident flow angle, and staggering distance.

9. A wing according to claim 1 and including means for jointly varying the angle of fluid flow incidence to said winglets.

10. A wing according to claim 1 wherein said main wing part and said winglet grid have swept back leading edges, the sweep angles relative to an incident free stream direction being selected to allow subsonic operation at high subsonic Mach numbers, thereby avoiding drag divergence due to compressibility.

11. A wing according to claim 1 wherein said main wing part comprises a sail for a marine vessel and said tip portion is positioned at a top of said sail.

12. A wing according to claim 1 wherein said grid comprises winglets having leading edges which are (a) parallel with each other, (b) converge toward a point beyond distal ends of said winglets, or (c) converge toward a point inwardly beyond the attachment of said grid to said main wing part.

13. A wing according to claim 1 wherein said line along which said winglets are staggered is a straight line.

14. A wing according to claim 1 wherein said grid is attached to said main wing part with a connecting body having a flat surface facing said grid.

* * * * *